United States Patent [19]

Stingl

[11] 4,092,103
[45] May 30, 1978

[54] PROCESS FOR DYEING NYLON WITH LOWER ALKYL ETHER-CONTAINING DIAZO DYES AND PRODUCT THEREOF

[75] Inventor: Hans Alfred Stingl, Toms River, N.J.

[73] Assignee: Toms River Chemical Corporation, Toms River, N.J.

[21] Appl. No.: 670,799

[22] Filed: Mar. 26, 1976

Related U.S. Application Data

[60] Continuation of Ser. No. 530,582, Dec. 9, 1974, abandoned, which is a division of Ser. No. 751,386, Aug. 9, 1968, Pat. No. 3,862,119.

[51] Int. Cl.² ............... C09B 31/02; D06P 1/06; D06P 3/24
[52] U.S. Cl. ..................................... 8/41 B; 260/186
[58] Field of Search ............... 8/41 B; 260/174, 178, 260/184, 186, 191

[56] References Cited

U.S. PATENT DOCUMENTS 3,485,814  12/1969  Speck ........................... 260/186
3,676,050  7/1972  James ........................ 260/186 X

FOREIGN PATENT DOCUMENTS 1,201,549  12/1959  France ........................... 260/186

Primary Examiner—Floyd D. Higel

Attorney, Agent, or Firm—Edward McC. Roberts; Prabodh I. Almaula

[57] ABSTRACT

Compounds of the formula

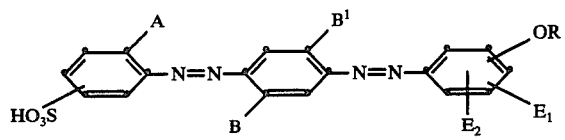

wherein A is hydrogen, lower alkyl, such as methyl, ethyl, butyl or lower alkoxy, such as methoxy, ethoxy, butoxy, or chlorine; B is hydrogen, lower alkyl such as methyl, ethyl or butyl or lower alkoxy, such as methoxy, ethoxy or butoxy; $B^1$ is lower alkoxy such as methoxy, ethoxy or butoxy; $E_1$ is hydrogen, lower alkyl such as methyl, ethyl, butyl or lower alkoxy such as methoxy, ethoxy or butoxy, $E_2$ is hydrogen, lower alkyl such as methyl or ethyl, lower alkoxy such as methoxy or ethoxy; R is lower alkyl of 1 to 4 carbon atoms, such as methyl, ethyl, propyl or butyl and OR is either ortho or para to the azo linkage; and —$SO_3H$ is either meta or para to A, provide yellow to scarlet dyeings of very good fastness and dyeing properties and excellent leveling characteristics on natural and synthetic polyamide fibers.

9 Claims, No Drawings

PROCESS FOR DYEING NYLON WITH LOWER ALKYL ETHER-CONTAINING DIAZO DYES AND PRODUCT THEREOF

This is a continuation of application Ser. No. 530,582, filed on Dec. 9, 1974, now abandoned which is a division of application Ser. No. 751,386, filed on Aug. 9, 1968, now U.S. Pat. No. 3,862,119, issued on Jan. 21, 1975.

BACKGROUND OF THE INVENTION

The use of monoazo-dyestuffs containing a sulfonic acid group for the dyeing of animal fibers and artificial fibers of superpolyamides or superpolyurethanes is known. However, the dyeing of nylon presents particular problems in obtaining good leveling and the achievement of optimum leveling is a very important consideration in the dyeing or printing of nylon in order to cover up irregularities.

SUMMARY OF THE INVENTION

The present invention relates and has for its objects the provision of dyestuffs particularly suited for the coloring of nylon fibers.

In accordance with the present invention, it has been found that valuable dyeings are obtained on natural and synthetic fibers by the use as dyestuffs of disazo compounds of the formula

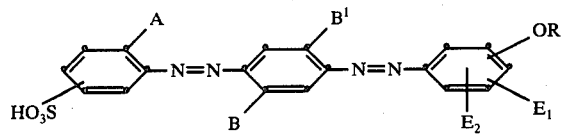

wherein A is hydrogen, lower alkyl, such as methyl, ethyl, butyl or lower alkoxy, such as methoxy, ethoxy, butoxy, or chlorine; B is hydrogen, lower alkyl such as methyl, ethyl or butyl or lower alkoxy, such as methoxy, ethoxy or butoxy; $B^1$ is lower alkoxy such as methoxy, ethoxy or butoxy; $E_1$ is hydrogen, lower alkyl such as methyl, ethyl, butyl or lower alkoxy such as methoxy, ethoxy or butoxy; $E_2$ is hydrogen, methyl, ethyl, methoxy or ethoxy; R is lower alkyl of 1 to 4 carbon atoms, such as methyl, ethyl, propyl or butyl and OR is either ortho or para to the azo linkage; and $—SO_3H$ is either meta or para to A.

The compounds of the present invention are prepared according to known procedures by diazotizing unsubstituted or properly ring-substituted metanilic or sulfanilic acids, coupling the diazotized compound with an arylamine such as alkoxy substituted aniline or its N-methane sulfonic acid, following with an alkali treatment in case of N-methane-sulfonic acid, rediazotizing the p-aminoazo compound, coupling the rediazotized product with a phenolic compound such as phenol, cresol or methoxy-phenol, followed by alkylation of the product to provide the novel dyestuff of the present invention.

The dyestuffs of the present invention can be employed in the form of their salts, for example, in the form of the ammonium or alkali metals, such as sodium, potassium or lithium salts.

The disazo-dyestuffs of the present invention have good water-solubility and can be used for dyeing or printing a very wide variety of materials, principally for dyeing animal fibers such as leather, silk and especially wool and for dyeing artificial fibers of superpolyamides or superpolyurethanes. The dyeings obtainable therewith are distinguished by the purity, brightness and strength of their tints, by good properties of fastness to alkali, light and washing, by good barre coverage and by good leveling and transfer properties.

The dyes of the present invention provide dyeings over a shade range from yellow to red.

The dyes will also dye well in combination, especially with the use of a leveling agent. If desired, a conventional after-treatment can be given to the dyed material.

The following examples illustrate the invention.

EXAMPLE 1

(A) 17.3 g. of metanilic acid are dissolved in 70 g. of water and 8 g. of 50% by weight caustic soda solution. Ice, 22 g. of conc. hydrochloric acid, and a solution of 7 g. of sodium nitrite in 20 g. of water are added with sufficient ice to maintain the temperature at 0°–3° C to diazotize the metanilic acid.

(B) 15.3 g. of 2,5-dimethoxyaniline, dissolved at 45° C in 120 g. of water and 11 g. of conc. hydrochloric acid are combined with the diazotized metanilic acid, using sufficient ice to keep the temperature below 5° C and the pH is raised to 2.5 with 20% soda ash solution. After completion of the coupling, the product is dissolved at pH 9 with 50% caustic soda solution and then salted with 50 g. of sodium chloride. Rediazotization is accomplished by addition of 7.5 g. of sodium nitrite, followed by an aqueous solution of 21 g. of naphthalenesulfonic acid and sufficient sulfuric acid to establish a congo acid reaction. A temperature of 32° C is maintained for 2 hours.

(C) This reaction mass is added during 1 hour to a solution of 9.4 g. of phenol, 3 g. of caustic soda, and 25 g. of soda ash in 200 g. of water while the temperature is held below 5° C by addition of ice. The resulting slurry is stirred for 2 hours, neutralized with hydrochloric acid, and filtered.

(D) The filter cake is charged into 250 g. of 95% ethanol, 100 g. of water, 8.5 g. of 50% by weight aqueous caustic soda solution, and 35 g. of soda ash in an autoclave. 25 g. of ethyl chloride is pumped in and the mixture is stirred for 20 hours at 110° C. It is then cooled, diluted to twice the volume with water, and filtered. The filter cake is dried to give an orange water-soluble product of the formula

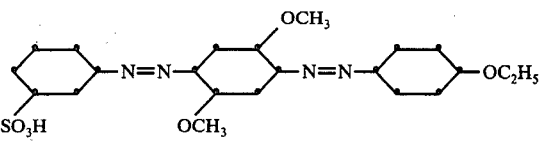

The product dyes nylon clear level shades of orange of good fastness properties.

EXAMPLE 2

The procedure of Example 1 is repeated except that in step C 12.4 g. of meta-methoxyphenol are employed in place of 9.4 g. of phenol.

The product obtained has the formula

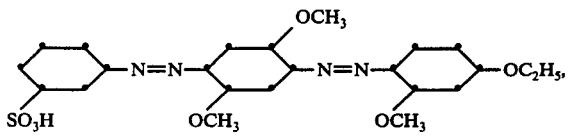

and dyes nylon clear level shades of scarlet having good fastness properties.

EXAMPLE 3

The procedure of Example 1 is repeated except that in step D 20 grams of methyl chloride are employed in place of 25 g. of ethyl chloride.

The product obtained has the formula

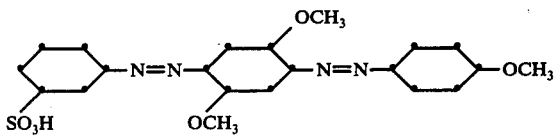

and dyes nylon clear and level shades of orange having good fastness properties.

EXAMPLE 4

The procedure of Example 1 is repeated except that in step C 10.8 g. of o-cresol are employed in place of 9.4 g. of phenol.

The product obtained has the formula

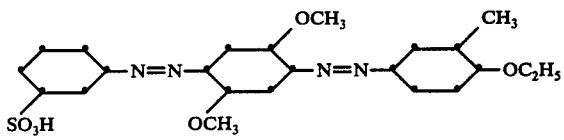

and dyes nylon clear level shades of orange with good fastness properties.

EXAMPLE 5

The procedure of Example 1 is repeated with the following modifications:

In step C 10.8 g of p-cresol are employed in place of 9.4 g. of phenol;

In step D the isolated product from step C is ethylated by treatment with 20 g. of diethylsulfate in 30 g. of water and 7 g. of caustic soda at 60° C. The reaction mixture is cooled and filtered. The filter cake is dried and the product obtained has the formula

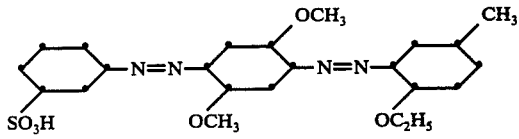

yielding clear level orange dyeings of good fastness properties.

EXAMPLE 6

(A) 17.3 g. of metanilic acid are diazotized employing the procedure set forth under Example 1(A).

(B) The resulting diazotized metanilic acid is combined at a temperature below 5° C with 13.7 g. of 2-methoxy-5-methylaniline previously dissolved in 120 g. of water at 45° C and 11 g. of concentrated hydrochloric acid. Sufficient 20% soda ash solution is added to raise the pH to 3.0 and the mixture is stirred for a period of 5 hours.

After completion of the coupling, the product is filtered off, redissolved in 500 g. of water at 50° C with 8 g. of a 50% by weight caustic soda solution and salted with 28 g. of sodium chloride after cooling to 20° C. Rediazotization is accomplished by addition of 7.2 g. of sodium nitrite, followed by an aqueous solution of 21 g. of naphthalenesulfonic acid and sufficient sulfuric acid to establish a congo acid reaction. One hour later an amount of sodium chloride equivalent to 20% of the volume of the slurry is added and the slurry cooled to 8° C. The precipitate is collected by filtration.

(C) The precipitate from B is reslurred in 250 g. of cold water and the resulting slurry is added over 1 hour to a solution of 9.4 g. of phenol, 3 g. of caustic soda and 20 g. of soda ash in 200 g. of water while the temperature is held below 5° C by the addition of ice. The product is salted with 70 g. sodium chloride, stirred for 2 hours and filtered.

(D) The filter cake is charged into 250 g. of 95% ethanol, 100 g. of water, 8.5 g. of 50% by weight aqueous caustic soda solution, and 35 g. of soda ash in an autoclave. 25 g. of ethyl chloride is pumped in and the mixture is stirred for 20 hours at 110° C. It is then cooled, diluted to twice the volume with water, and filtered. The filter cake is dried to give an orange water-soluble product of the formula

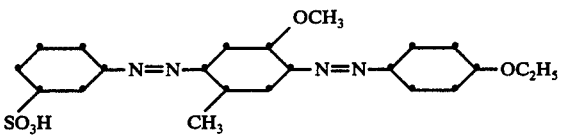

The product dyes nylon level shades of dull orange-yellow having good fastness properties.

EXAMPLE 7

The procedure of Example 6 is repeated except that in step C 10.8 g. of o-cresol are used in place of the 9.4 g. of phenol.

The product obtained has the formula

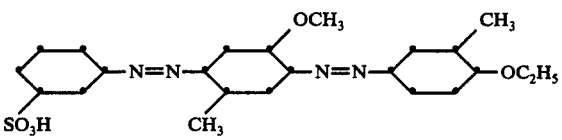

and dyes nylon clear level shades of yellow-orange of good fastness properties.

EXAMPLE 8

The procedure of Example 6 is repeated except that in step C 12.4 g. of meta-methoxyphenol are used in place of the 9.4 g. of phenol.

The product obtained has the formula

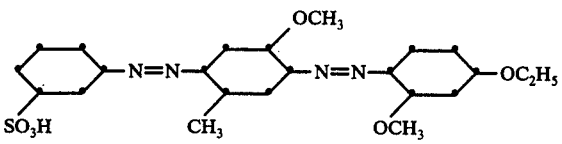

and dyes nylon clear level shades of reddish-orange of good fastness properties.

EXAMPLE 9

(A) 17.3 g. of sulfanilic acid are diazotized in 50 g. of ice-water and 11 g. of concentrated hydrochloric acid by the rapid addition of a concentrated solution of 7 g. of sodium nitrite in water at about 4° C.

(B) The resulting diazotized sulfanilic acid is combined at a temperature below 5° C with 13.7 g. of 2-methoxy-5-methylaniline previously dissolved in 120 g. of water at 45° C and 11 g of concentrated hydrochloric acid. Sufficient 20% soda ash solution is added to raise the pH to 3.0 and the mixture is stirred for a period of 5 hours.

The coupling product is then acidified to a pH of 1.5 and isolated by filtration. The product is dissolved in 250 g. of water at 50° C with sufficient caustic soda to raise the pH to 8.0. To this solution there is added 7.2 g. of sodium nitrite together with 10 g. of sodium naphthalenesulfonate. The resulting reaction mixture is then gradually added to 200 g. of water containing 45 g. of concentrated hydrochloric acid and the mixture stirred for 1 hour at 30° C.

(C) The mixture from B is added during a 1 hour period to a solution of 9.4 g. of phenol, 6 g. of caustic soda and 25 g. of soda ash in 200 g. of water while the temperature is held below 5° C by the addition of ice. The resulting slurry is stirred for 2 hours, salted with 120 g. of sodium chloride and filtered.

(D) The filter cake is charged into 250 g. of 95% ethanol, 100 g. of water, 8.5 g. of 50% by weight aqueous caustic soda solution, and 35 g. of soda ash in an autoclave. 25 g. of ethyl chloride is pumped in and the mixture is stirred for 20 hours at 110° C. It is then cooled, diluted to twice the volume with water, and filtered. The filter cake is dried to give an orange water-soluble product of the formula

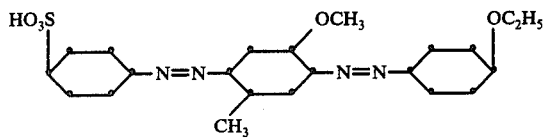

The product dyes nylon clear level shades of yellow-orange of good fastness properties.

EXAMPLE 10

The procedure of Example 9 is repeated except that in step C 10.8 g. of o-cresol are employed in place of 9.4 g. of phenol.

The product obtained has the formula

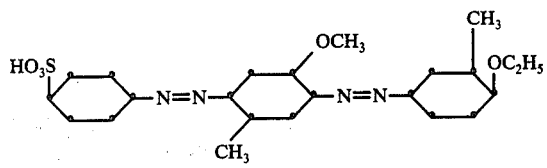

and dyes nylon clear level shades of yellow-orange of good fastness properties.

EXAMPLE 11

The procedure of Example 9 is repeated except that in step C 12.4 g. of guaiacol are employed in place of 9.4 g. of phenol.

The product obtained has the formula

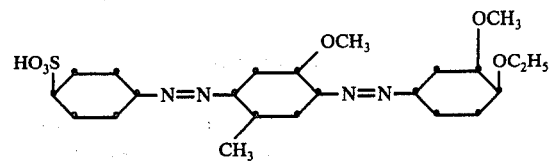

and dyes nylon clear level shades of yellow-orange of good fastness properties.

EXAMPLE 12

(A) 17.3 g. of metanilic acid are diazotized by the procedure set forth in Example 1(A).

(B) The pH of the resulting solution is adjusted to 2.5 by addition of sodium bicarbonate. 6.6 g. of sodium acetate is added, followed by the addition of 22.5 g. of o-anisidyl-N-methanesulfonic acid, while maintaining the temperature of the reaction mixture at about 5°-7° C by means of ice and cold water and stirring for a period of 1 hour. 38 g. of a 50% by weight solution of caustic soda are then added and the mass is heated at 100° C for 8 hours. The mass is then cooled, 28 g. of sodium bicarbonate are added to adjust the pH to 9, salted with 33 g. of sodium chloride and filtered.

The filter cake is dissolved in 800 g. of water at 30° C. To this solution there is added 7 g. of sodium nitrite, followed by addition of an aqueous solution of 21 g. of naphthalenesulfonic acid and sufficient sulfuric acid to establish a congo acid reaction and the mixture maintained at 32° C for a period of 2 hours.

(C) The mixture from B is added during a 1 hour period to a solution of 9.4 g. of phenol, 3 g. of caustic soda and 25 g. of soda ash in 200 g. of water while the temperature is held below 5° C by the addition of ice. The resulting slurry is stirred for 2 hours, neutralized with hydrochloric acid and filtered.

(D) The filter cake is charged into 250 g. of 95% ethanol, 100 g. of water, 8.5 g. of 50% by weight aqueous caustic soda solution, and 35 g. of soda ash in an autoclave. 25 g. of ethyl chloride is pumped in and the mixture is stirred for 20 hours at 110° C. It is then cooled, diluted to twice the volume with water, and filtered. The filter cake is dried to give a water-soluble product of the formula

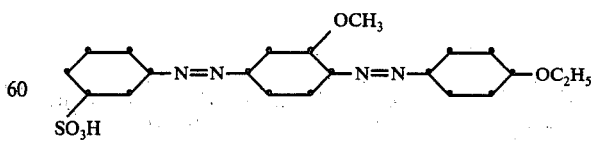

The product dyes nylon clear level shades of yellow of good fastness properties.

Following the general procedure above and employing the corresponding reactants the compounds below are prepared providing the indicated shade.

EXAMPLE 13

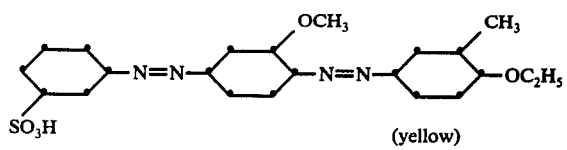
(yellow)

EXAMPLE 14

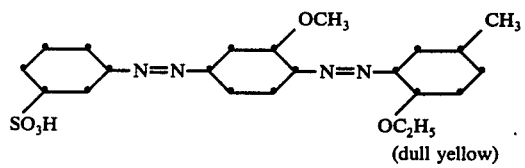
(dull yellow)

EXAMPLE 15

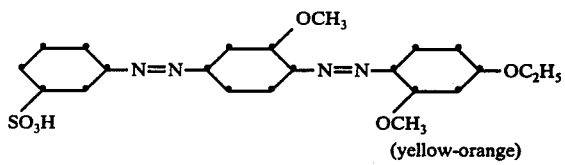
(yellow-orange)

EXAMPLE 16

20.3 g. of 3-amino-4-methoxybenzene sulfonic acid are neutralized in 125 g. of water with 8 g. of 50% by weight caustic soda solution. Insoluble matter is then removed by filtration. The clear solution is acidified with 22 g. of conc. hydrochloric acid and diazotized at 0°–3° C by rapid addition of 7 g. of sodium nitrite in 20 g. of water, and of ice.

It is then combined with 13.7 g. of 2-methoxy-5-methylaniline by the procedure set forth in Example 6.

The coupling product is filtered off the next morning, dissolved in 800 g. of water containing 4 g. of caustic soda, and salted with 40 g. of sodium chloride. 7 g. of sodium nitrite are added, followed after cooling to 12° C by an aqueous solution of 30 g. of naphthalenesulfonic acid and sufficient sulfuric acid to establish a congo acid reaction. Three hours later this reaction mass is added during one half hour to a solution of 9.4 g. of phenol, 3 g. of caustic soda, and 35 g. of soda ash in 200 g. of water while the temperature is held below 5° C by addition of ice. After stirring for 2 hours the pH is reduced to 8.0 with hydrochloric acid and the product is collected on a filter funnel.

The filter cake is ethylated in an autoclave by the procedure of Example 1(D). The product obtained has the structure

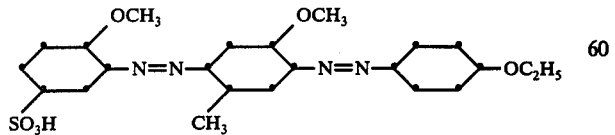

and dyes nylon clear level shades of yellow-orange.

Following the procedure set forth in Example 16 and employing the corresponding reactants the compounds below are prepared, providing the indicated shade.

EXAMPLE 17

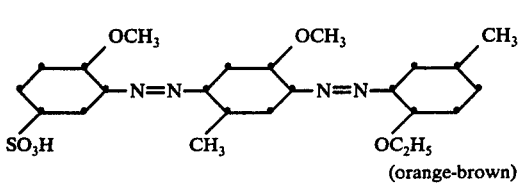
(orange-brown)

EXAMPLE 18

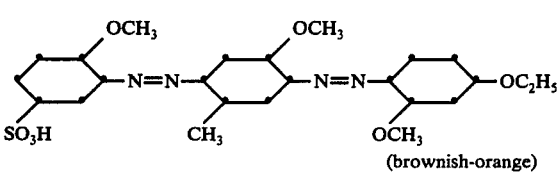
(brownish-orange)

The following examples illustrate further—but by no means limit—the scope of this invention.

EXAMPLE 19

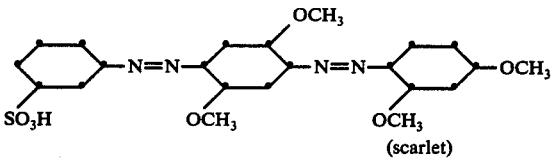
(scarlet)

EXAMPLE 20

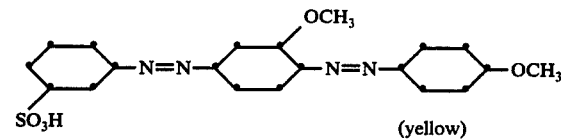
(yellow)

EXAMPLE 21

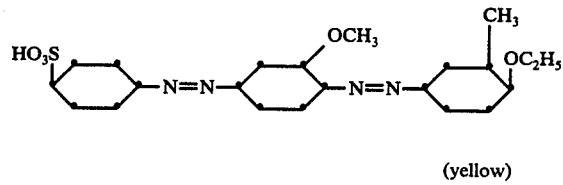
(yellow)

EXAMPLE 22

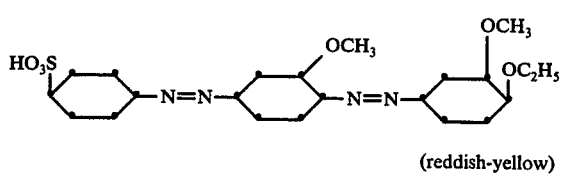
(reddish-yellow)

EXAMPLE 23
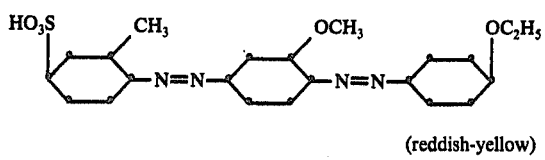
(reddish-yellow)
EXAMPLE 24
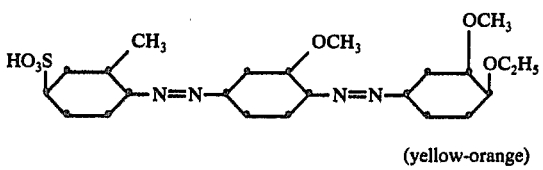
(yellow-orange)
EXAMPLE 25
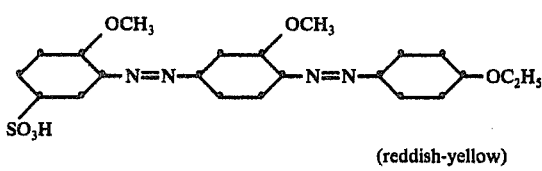
(reddish-yellow)
EXAMPLE 26
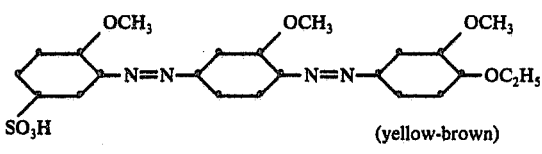
(yellow-brown)
EXAMPLE 27
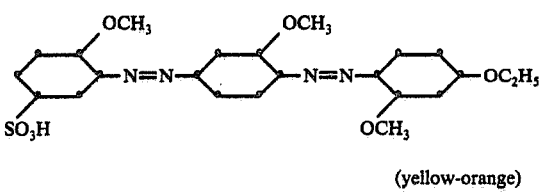
(yellow-orange)
EXAMPLE 28
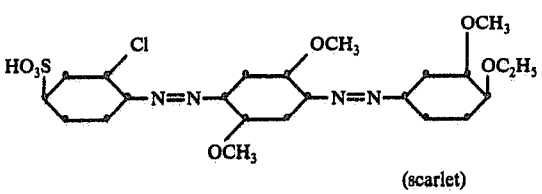
(scarlet)
EXAMPLE 29
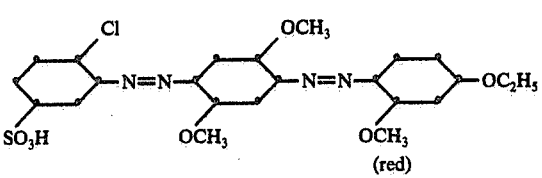
(red)
EXAMPLE 30
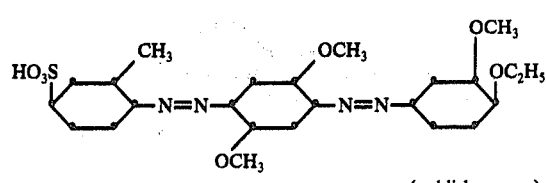
(reddish-orange)
EXAMPLE 31
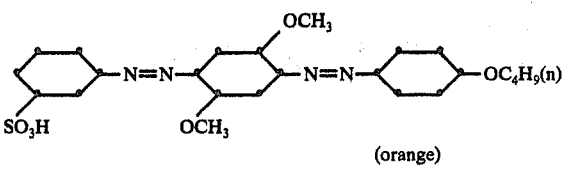
(orange)
EXAMPLE 32
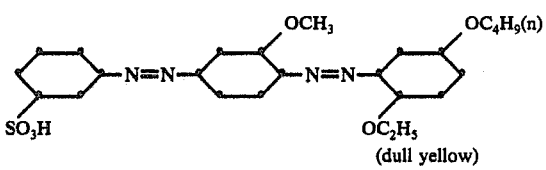
(dull yellow)
EXAMPLE 33
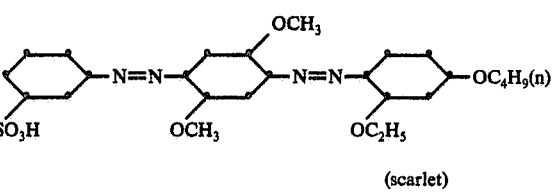
(scarlet)
EXAMPLE 34
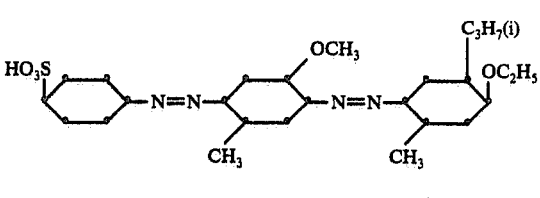
(orange)
EXAMPLE 35
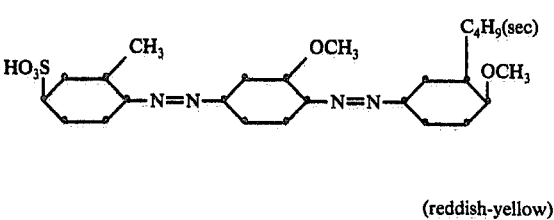
(reddish-yellow)

EXAMPLE 36

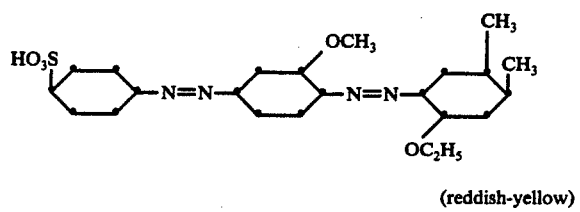

(reddish-yellow)

EXAMPLE 37

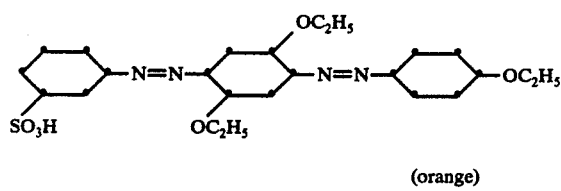

(orange)

EXAMPLE 38

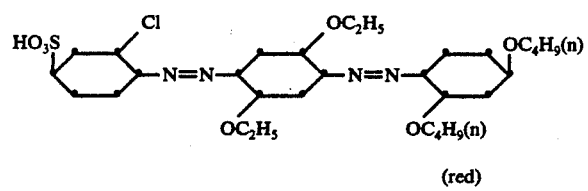

(red)

I claim:
1. Nylon fiber dyed with a compound of the formula

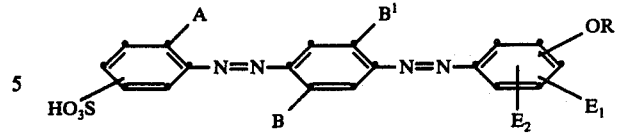

wherein A is hydrogen, lower alkyl, lower alkoxy or chlorine, B is hydrogen, lower alkyl, or lower alkoxy, $B^1$ is lower alkoxy, $E_1$ is hydrogen, lower alkyl, or lower alkoxy, $E_2$ is hydrogen, lower alkyl or lower alkoxy, R is lower alkyl, —OR is ortho or para to the azo linkage and —$SO_3H$ is meta or para to A.

2. The nylon fiber of claim 1, wherein A is H, —$SO_3H$ is para to A, and B and $B^1$ are —$OCH_3$.

3. The nylon fiber of claim 2, wherein R is —$C_2H_5$ and OR is para to the azo linkage and $E^1$ and $E^2$ are H.

4. The nylon fiber of claim 2, wherein R is —$CH_3$ and OR is para to the azo linkage and $E^1$ and $E^2$ are H.

5. The nylon fiber of claim 2, wherein $E_1$ is H, $E_2$ is —$OCH_3$ ortho to the azo linkage, R is —$C_2H_5$ and OR is para to the azo linkage.

6. The nylon fiber of claim 2, wherein R is —$C_2H_5$, OR is ortho to the azo linkage, $E_1$ is H and $E_2$ is —$CH_3$ para to the OR group.

7. The nylon fiber of claim 2, wherein $E_1$ and $E_2$ are H, R is n—$C_4H_9$ and OR is para to the azo linkage.

8. The nylon fiber of claim 1, wherein A, B and $E_1$ are H, —$SO_3H$ is para to A, R is —$C_2H_5$, OR is para to the azo linkage and $E_2$ is —$CH_3$ meta to the azo linkage.

9. The nylon fiber of claim 1, wherein A is —Cl, —$SO_3H$ is meta to A, B and $B_1$ are —$OCH_3$, R is —$C_2H_5$, OR is para to the azo linkage, $E_1$ is —$OCH_3$ meta to the azo linkage and $E_2$ is H.

* * * * *